Patented Mar. 8, 1938

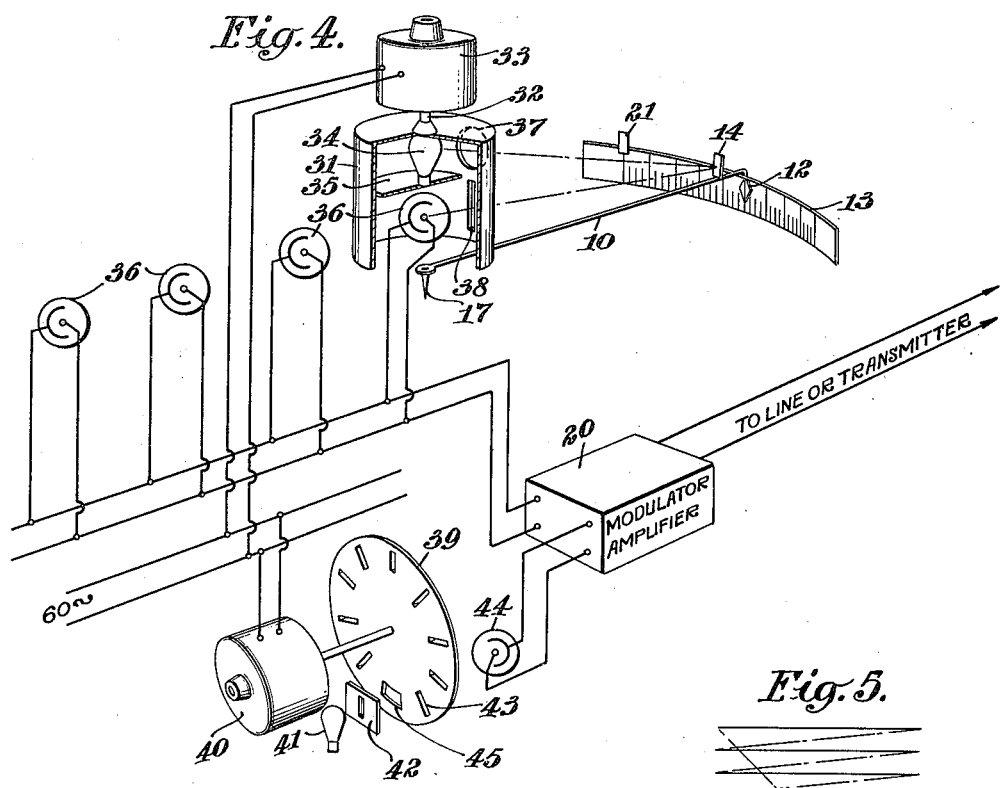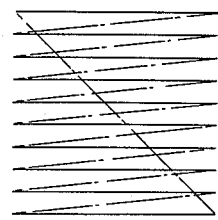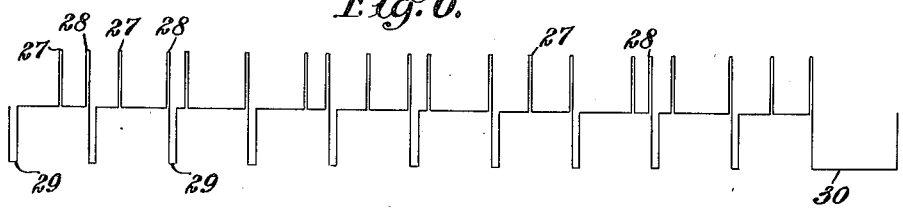

2,110,746

UNITED STATES PATENT OFFICE 2,110,746

TELEMETERING SYSTEM

William A. Tolson, Westmont, N. J., assignor to Radio Corporation of America, a corporation of Delaware Application March 30, 1934, Serial No. 718,166

7 Claims. (Cl. 177—351)

My invention relates to telemetering systems and more particularly to a system of that class which provides means for continuously scanning each of a plurality of instrument pointers or the like and reproducing, at a remote station, an indication of the position occupied by each pointer in respect to a scale of reference covering the range of movement thereof.

My invention has particular utility in the operation of power transmission networks where it is necessary for the load dispatcher to be informed as to the distribution of load and other operating conditions throughout the system, in order that the network as a whole may be operated at its highest efficiency. Under present conditions it is customary for the operators at various generating stations and sub-stations to communicate to the load dispatcher, at regular intervals, information relating to conditions of load, voltage, power factor and the like.

In carrying out my invention, it is possible to transmit signals indicative of instrument-pointer settings with respect to their scales of reference, use being made of a scanning device or devices at the sending station where the instruments are located, and use being further made of any convenient channel of communication between the sending and receiving stations. Translating means are provided at the receiving station for reproducing such indications of instrument readings as may be desired. The scanning operation may be made continuous. During each cycle a plurality of scanning fields may be covered, each scanning field being occupied by an instrument pointer and the scale over which it moves. The scanning device may be positioned behind the pointer scale so as not to interfere with local observation of the instrument.

It will be seen from the above brief description that my invention has for its principal object to provide a telemetering system capable of furnishing accurate and instant information at a remote point as to the settings of each of a plurality of movable instrument pointers.

A further object of my invention is to provide means for scanning a plurality of fields respectively occupied by instrument pointers and to indicate at a remote point the results of the scanning operations in such a manner that the reproduced images of pointer settings will appear to an observer to be continuous and to move as the pointers move.

A further object of my invention is to provide a telemetering system in which the most approved of television apparatus may be employed, thereby to reproduce at a remote point images of instrument pointers and their scales of reference.

The foregoing and other objects hereinafter to appear, I propose to carry out according to one or another of several possible modifications of my invention, some of which will now be described in detail, reference being had to the accompanying drawings wherein.

Figure 1:
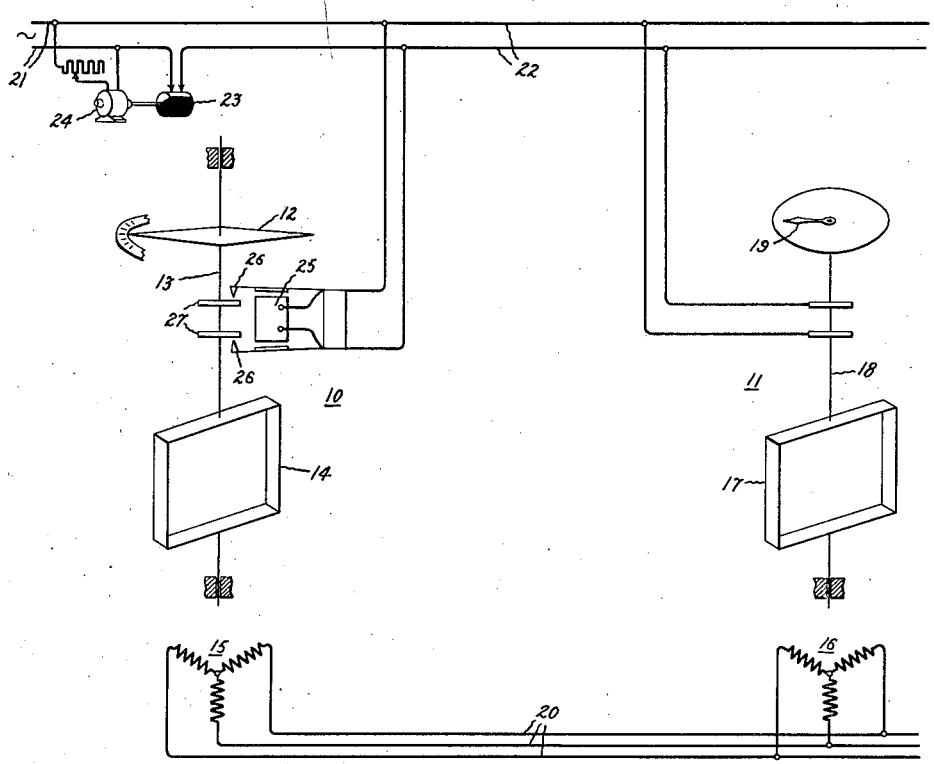
Figure 1 shows, more or less diagrammatically, one form of scanning and transmitting apparatus suitable for my telemetering system.

Referring now to Figure 1, the general arrangement of my invention is shown as pertaining to the operation of scanning a meter or instrument pointer. The details of the meter itself, other than its pointer and scale are omitted in order not to encumber the drawings with irrelevant matter. The pointer arm 10 will be seen, however, to be mounted on a vertical spindle 11 so as to move its target 12 arcuately over the scale 13. Mounted on the pointer arm, is a minute mirror 14 which is so positioned as to reflect a beam of light emanating from the cathode ray tube 15 onto a photo-electric cell 16.

In one of the embodiments of my invention I employ at the transmitting station a tube 15 which may be of any conventional type having suitable elements for projecting an electronic beam from its cathode onto a fluorescent screen. The beam is deflected in the usual manner both horizontally and vertically as practiced in the television art. A deflecting unit 18 is provided for this purpose. The cathode ray thus illuminates the fluorescent screen of the tube 15 and a spot of light is generated thereon the image of which may be projected through the lens 17 and reflected by the mirror 14 onto the photo-electric cell 16. While the spot of light is traversing the fluorescent screen, its image traverses the instrument scale in the opposite direction. At the instant when it is focussed upon the mirror 14 the photo-electric cell 16 reacts to initiate a signal.

My transmitter may comprise further an amplifier 20 by which the signals picked up by the photo-electric device 16, may be impressed as ous check on the amplitude of the deflection at the receiver.

Figure 5:
Figure 5 is a diagram showing the principle of operation of a deflecting unit such as would be used in my telemetering system.

Referring to Figure 5, it will be seen that the scanning operation may be performed with the aid of a wave shaping device embodied in the deflecting unit 18 and likewise in the deflecting unit 23. Such a wave shaping device, as is usual in television apparatus, produces a saw-tooth pattern in which the return lines are much more rapidly covered than the scanning lines. In Figure 5, full lines are used to represent the scanning lines and dot and dash lines are used to represent the return lines of the scanning pattern. In the reception of signals, the time taken up by the portion of the saw-tooth wave of the return lines is utilized for synchronizing, a synchronizing signal being sent for every horizontal scanning line and for separating successive cycles of vertical scanning. The synchronizing signals being negative, will drive the grid of the cathode ray tube sufficiently negative to extinguish the beam during the time interval when the return lines will be scanned.

Figure 6:
Figure 6 is a diagram showing the wave form of the signals by which the apparatus at a receiving station may be controlled and synchronized with the apparatus at the transmitter.
Figure 7:
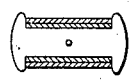

In Figure 6, I have shown the order in point of time in which the signals are to be transmitted. If the signals are to be transmitted over a metallic conductor they may be made positive, as shown at 27, to represent the positions of the several instrument pointers. Positive impulses will also be used, as shown at 28, to represent the full scale readings. The negative impulses, shown at 29, may then be used for synchronization between the scanning lines, and, as shown at 30, for synchronization between successive repetitions of the vertical scanning component. If a carrier wave is used, the signals would constitute amplitude modulations of the carrier. To distinguish positive from negative impulses, when transmitted on a carrier, the amplitude of the carrier wave can be increased from a normal level thereby to designate the positions of the pointers and of the full scale readings, while the amplitude is decreased from the normal level to represent the synchronizing signals; or vice versa.

Figure 4:
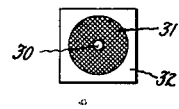
Figure 4 shows diagrammatically a modified arrangement for scanning a plurality of instrument pointers.

Referring now to Figure 4, I show a somewhat different arrangement for scanning a plurality of fields each occupied by a different instrument pointer. In this case, a scanning drum 31 may be utilized. This drum is mounted on a vertical shaft 32 and is preferably driven by a small synchronous motor 33. Within the scanning drum is a constant source of light 34 mounted on a stationary platform 35. Below the platform 35 and also stationarily mounted, is a photo-electric cell 36. The scanning drum is provided with a comparatively wide orifice 37 through which light may be emitted from the lamp 34. The beam is arranged to fall upon and be reflected back by the mirrors 14 and 21. Hence, it may be momentarily projected through the narrow slit 38 in the scanning drum and onto the photo-electric cell 36. At the moment when the angular positions of the slit 38 and of either the mirror 14 or the mirror 21 coincide, the photo-electric cell 36 will respond to the action of the light beam.

Scanning drums, such as just described, may be provided for each of a plurality of different instruments to be telemetered. Photo-electric cells for some of the scanning units have been shown in the figure as parallel-connected to the amplifier 20.

In order that successive scannings of different instruments may be properly timed with respect to the synchronizing signals, it is necessary that all of the scanning drums be arranged with their scanning slits 38, having a definite angular separation between one another. Thus, if ten instruments are to be scanned cyclically, the scanning slits 38 of the respective drums 31 will be rotated at angles of 36° of phase difference from one to the next. That is to say, if a scanning line for a single instrument extends through a 36° arc, one horizontal scanning operation along one instrument scale will be completed at the moment of commencement of the scanning operation with respect to the scale of another instrument.

In order to transmit synchronizing signals by which the apparatus at the receiver may be properly coordinated with the scanning operations at the transmitter, a scanning disc 39 may be employed. This disc is preferably rotated by its own motor 40, a synchronous motor operating from the same alternating current source as is used to supply the scanning drum motors 33. The synchronizing device comprises further a lamp 41 suitably positioned with respect to a screen 42 having a light slit for projecting a thin beam of light through the scanning aperture 43 of the scanning disc 39. On the opposite side of the scanning disc from the lamp is positioned a photo-electric cell 44 suitably connected to the amplifier unit 20 so that synchronizing signals may be sent over the line or other communication channel. It will be seen that by this arrangement sharply defined synchronizing impulses may be transmitted at the frequency of succession of the horizontal line scannings, and a further signal separating the cycles of the vertical scanning component may be transmitted when the light is projected through the wider opening 45 in the scanning disc 39.

Figure 2:
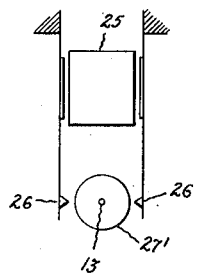
Figure 2 shows, also diagrammatically, one embodiment of receiving apparatus suitable for my telemetering system.
Figure 3:
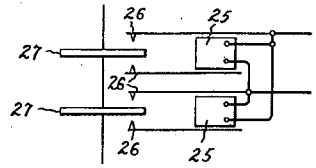
Figure 3 is a front view of a cathode ray tube having a fluorescent screen on which may be projected indications of a plurality of pointer settings together with reference points at the extremities of the instrument scales over which the pointer indications move.

When the apparatus shown as a modification in Figure 4 is used, then (as well as when using the device of Figure 1) the signals may be received on the cathode ray tube shown in Figures 2 and 3. The relative advantages of the cathode ray tube 15 as shown in Figure 1 and of the motor driven scanning drum 31 as shown in Figure 4, can be best understood when the higher first cost of the cathode ray tube is weighed against its operational advantages. Even though the first cost may be considerable, the cathode ray tube operates without inertia and its scanning operation is automatically maintained in proper phase relation with the operation of the deflecting unit. On the other hand, the scanning drums 31, shown in Figure 4, are somewhat less costly to produce, but, unfortunately, each drum must be individually "phased in" with respect to the others, and the services of an attendant are required to perform the "phasing in" operation when the system is started up. A monitoring cathode ray tube receiver is preferably utilized at the transmitting station so that, when "phasing in", the attendant may see exactly what signals are being transmitted and may correct the adjustment of each scanning drum according to the indications received on the fluorescent screen. Once the drums are properly phased, however, they should present little or no further difficulty in performing their functions. It will be appreciated that if the motor 33 has four poles, the armature could go into synchronism in either of two angular positions, but only one of these positions would be of the correct phase for performing the scanning operation with respect to a particular instrument. Similarly, with a motor 33 of the six-pole type, its armature could occupy any one of three angular positions, only one of which would be correct for the scanning operation. The "phasing in" of the motor 40 presents the same problem whether it be of the four-pole or of the six-pole type.

My telemetering system has many advantages over any other system known to the applicant. The cyclic scanning of a plurality of fields, each occupied respectively by an instrument pointer and its scale, may be accomplished with such rapidity as to present a persistent impression to the eye of an observer at the receiving station. Thus, for example, if the scanning operation is repeated fifteen times per second and ten instruments are successively scanned during each scanning cycle, each instrument having a 50-division scale, then an accuracy of indication to within one division of the scale may easily be had. To do this a frequency band of from 15 to 7500 cycles per second should be available. Greater accuracy may be secured by proportionately widening the frequency band. More or less than ten such instrument readings may, of course, be transmitted during one scanning cycle, according to requirements and according to the angular swing of each instrument needle.

The deflecting unit is preferably caused to function as a wave shaping device and to produce a wave of saw-tooth pattern for controlling the scanning operation in the cathode ray tube. The amplifier is preferably one which will pass a band of frequencies of from 15 to 7500 cycles, assuming the conditions to be as stated above for successively scanning ten instrument scales, each having 50 divisions.

Although I have disclosed herein certain specific embodiments of my invention, it is to be understood that these embodiments are merely illustrative of my invention and that other modifications suggested by the disclosure but not specifically described herein may be made without departing from the spirit and scope of my invention as defined in the claims. My invention therefore is not to be limited except in so far as is necessitated by the prior art and by the scope of the claims.

I claim as my invention:

1. Apparatus for producing at a receiving station a plurality of indications of instrument-pointer settings, each indication being coordinated with a point of reference, comprising scanning means at a sending station adapted to successively scan a plurality of fields, each field having therein a mirror mounted on a movable instrument-pointer and a second mirror mounted at one extremity of the pointer's range of movement, means including a plurality of photo-electric devices under control of light beams reflected by each of said mirrors for initiating signals at the moments determined by said scanning means, there being a separate photo-electric device for each instrument-pointer-mirror, a channel of communication between said sending station and said receiving station, means including a cathode ray device and an electronic beam deflector at said receiving station adapted to respond to said signals when transmitted over said channel for indicating the positions of the instrument pointers, and of the range-extremity reference points, and means for synchronizing the operation of said deflector with that of said scanning means.

2. In a telemetering system a plurality of index members each movable over its own scale and each having means for intercepting a light beam, a device for successively and cyclically scanning the several index members and scales, means for transmitting signalling impulses in synchronism with the operation of said scanning device, photo-electric means for initiating and transmitting further signals when said beam intercepting means are scanned, and receiving apparatus adapted to translate said further signals into visible indications showing the position of each index member with respect to its scale.

3. Apparatus in accordance with the immediately preceding claim in which further means are provided in combination with said photo-electric means for initiating and transmitting signals when a fixed point on each of said scales is scanned, the last said signals being effective at the receiving apparatus to indicate the correlation between the fixed points and the positions of the index members.

4. Apparatus in accordance with claim 2 in which each of the beam intercepting means is constituted by a mirror and the scanning device is provided with an optical system adapted to cooperate with each mirror for projecting a light beam so as to be responded to by said photo-electric means at suitable instants in the scanning cycle.

5. In a telemetering system, a plurality of movable index members the setting of each of which with respect to a scale of reference is to be indicated at a remote station, scanning means for cyclically exploring the fields within which said index members are respectively movable, means for transmitting signals, means including a photo-responsive pick-up device for initiating said signals, synchronizing means adapted to control said scanning means and to transmit further signals, and means carried by said index members for causing the scanning means to cooperate with the photo-responsive device to characterize the signals in accordance with the positions occupied by each index member with respect to a scale of reference.

6. In a telemetering system in which the respective positions occupied by a plurality of independently movable index members may be indicated at a remote station, the method of transmission and reception of signals characteristic of such positions which comprises generating a cyclically modulated carrier wave, cyclically and successively scanning the respective zones within which said index members are movable, each scanning operation being synchronized with the cyclic modulation of said carrier wave, impressing signalling impulses upon said carrier wave in accordance with the elements of the scanning operation which are affected by scanning the index members per se, and translating the received signals into visible indications of said index members, each in its scanned position with respect to a zone of reference.

7. In a telemetering system a plurality of index members each movable over a defined field and each having means for intercepting a light beam, a device for successively and cyclically scanning the several index members and field, means for transmitting signalling impulses in synchronism with the operation of said scanning device, photo-electric means for initiating and transmitting further signals when said beam intercepting means are scanned, and receiving apparatus adapted to translate said further signals into visible indications showing the position of each index member with respect to the field.

WILLIAM A. TOLSON.

Dec. 13, 1938.  H. GAWEHN  2,140,380

ROTARY MOTION TRANSMITTING SYSTEM

Filed March 8, 1938

Inventor:
Herbert Gawehn,
by Harry E. Dunham
His Attorney.